Figure 1:
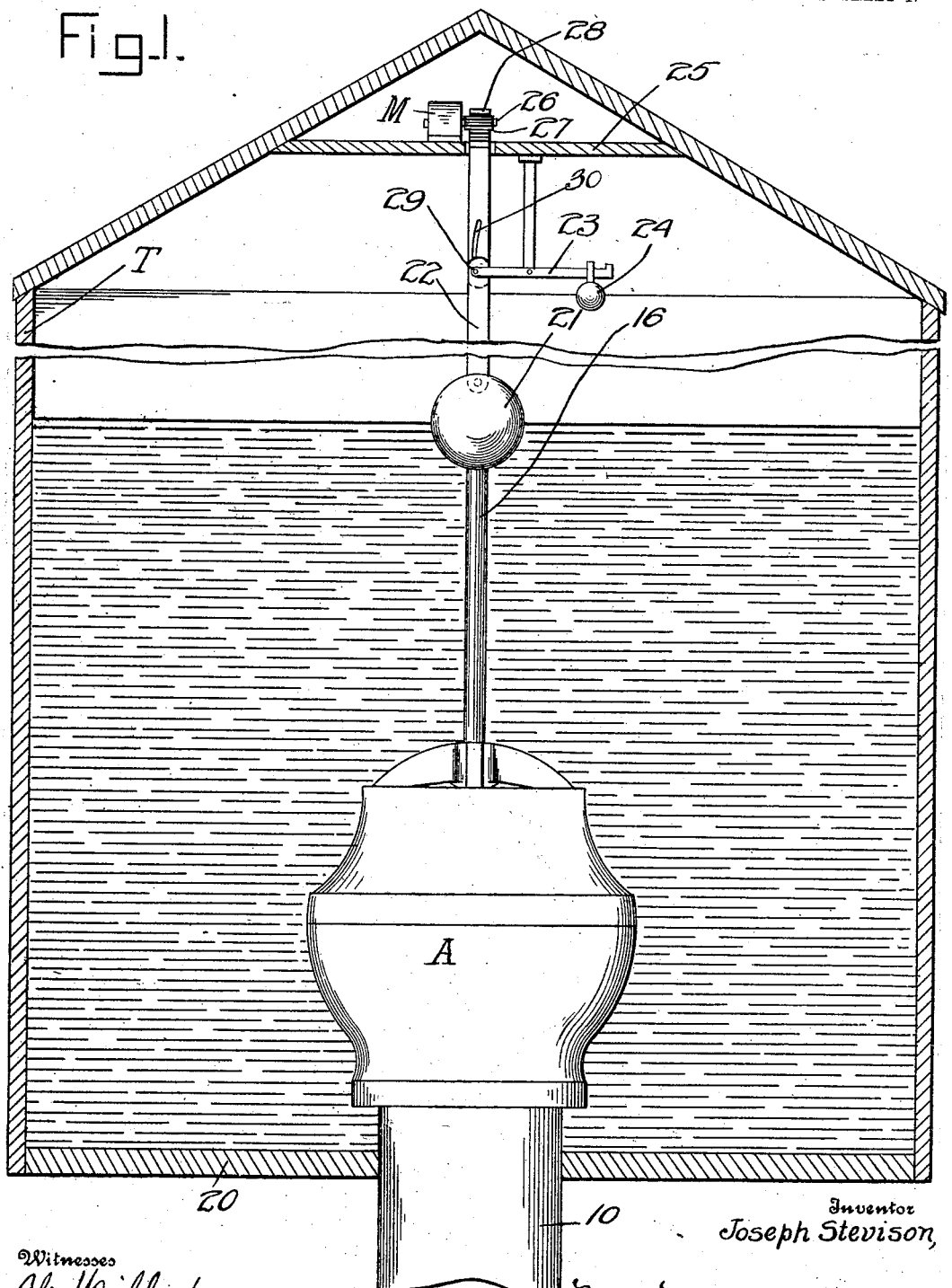

J. STEVISON.
VALVE.
APPLICATION FILED JULY 6, 1908.

928,815.

Patented July 20, 1909.
2 SHEETS—SHEET 1.

Inventor
Joseph Stevison,

Witnesses
J. W. Miller
M. O. Bowling

By Wm Bagger & Co.
Attorneys

J. STEVISON.
VALVE.
APPLICATION FILED JULY 6, 1908.
928,815.
Patented July 20, 1909.
2 SHEETS—SHEET 2.
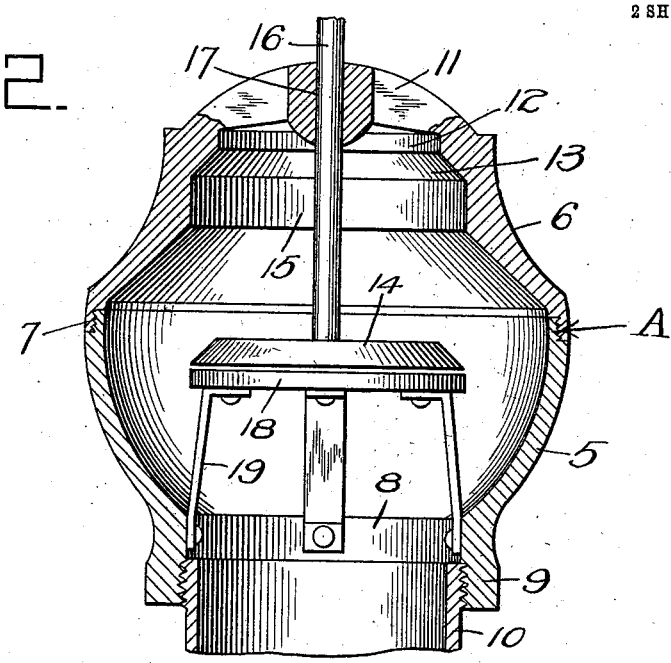
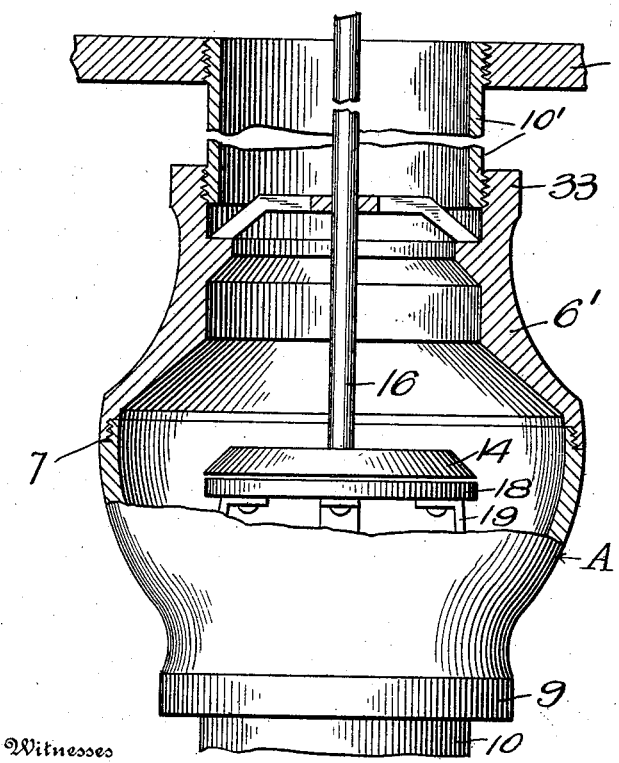
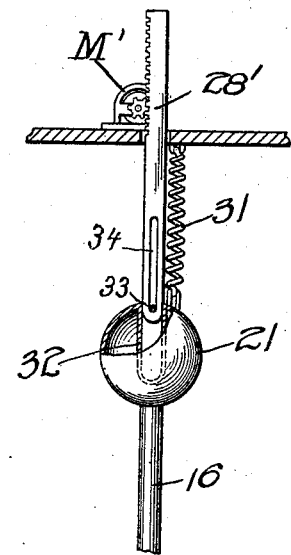
Inventor
Joseph Stevison,
Witnesses

UNITED STATES PATENT OFFICE.

JOSEPH STEVISON, OF PLATTEVILLE, WISCONSIN.

VALVE.

No. 928,815.  Specification of Letters Patent.  Patented July 20, 1909.

Application filed July 6, 1908. Serial No. 442,054.

*To all whom it may concern:*

Be it known that I, JOSEPH STEVISON, a citizen of the United States, residing at Platteville, in the county of Grant and State of Wisconsin, have invented certain new and useful Improvements in Valves, of which the following is a specification.

This invention relates to valves for controlling the admission and eduction of water to and from tanks or reservoirs, in which the water is admitted and discharged through a stand-pipe connected with the bottom of such tank; the objects of the invention being to provide a valve of simple and improved construction which shall operate automatically to regulate the flow of the water; further objects of the invention being to simplify and improve the construction and operation of this class of devices.

With these and other ends in view which will readily appear as the nature of the invention is better understood the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawings—Figure 1 is a vertical sectional view of a tank equipped with the improved valve, the latter being shown in elevation. Fig. 2 is a vertical sectional view showing the valve, detached. Fig. 3 is a vertical sectional view of the valve illustrating a modification whereby the valve is located in the stand-pipe instead of in the body of the tank. Fig. 4 is a detail view, in elevation, illustrating a modified arrangement of the float used in connection with the valve.

Corresponding parts in the several figures are denoted by like characters of reference.

The valve-casing A is composed of the lower and upper members 5 and 6 having threaded connection with each other at 7 so that the said parts or members may be readily separated to afford access to the interior of the casing. The lower member 5 has at the bottom thereof a large aperture 8 which is surrounded by a flange 9, the latter being interiorly threaded for the reception of the stand-pipe 10. The upper part or member 6 has in the top thereof a large opening or aperture 12 which is spanned by a yoke or cross-bar 11.

In the member 6 of the valve-casing, adjacent to the aperture 12, is formed a seat 13 for a downwardly-opening valve 14; and adjacent to and below the valve-seat 13 is formed a cylindrical passage 15 the diameter of which is equal to that of the valve-disk 14, so that when the latter moves in the direction of its seat the pressure of the inrushing liquid will have a tendency to force the valve to a seated position, very swiftly and efficiently. The valve-disk 14 is supported upon a stem 16 which is guided through an aperture 17 in the yoke 11.

A disk or deflector 18 is supported upon legs or brackets 19 the lower ends of which are riveted or otherwise secured upon the inside of the member 5 of the valve-casing, adjacent to the upper end of the stand-pipe, thus supporting the disk 18 a suitable distance above the stand-pipe; the purpose of the disk 18 being to serve as a deflector to break the force of the inrushing liquid which, in the absence of said disk or deflector, would have a tendency to displace the valve in an upward direction and to force it to a seated position ahead of time, and irrespective of other conditions.

In Fig. 1 of the drawings the valve-casing has been shown arranged in a tank or reservoir T through the bottom 20 of which the stand-pipe 10 extends. The valve-stem 16 is provided with a float 21 which is connected by a link 22 with one end of a suitably supported lever 23, having a counterweight 24. The position of the float 21, and of the valve controlled thereby, is obviously governed by the state of the water-level in the tank; when the water rises the valve moves to a seated position thus obstructing further ingress of water when predetermined level has been attained; when the water-level sinks below the normal, the valve will be automatically opened.

Suitably supported, as upon a shelf or bracket, 25, below the roof of the tank is a suitable generator or motor, conventionally designated by letter M, said motor including a driven shaft 26 carrying a pinion 27 meshing with a suitably guided vertically-movable rack-bar 28, the lower end of which is loosely connected with the link 22 which connects the float 21 with the lever 23. In Fig. 1 of the drawings the connection is effected by a pivotal pin 29 which serves to connect the lever 23 with the link 22; said pin engaging an arcuate slot 30 in the rack-bar. It follows that the float, the lever and the connecting link may move in the exercise of their respective functions without affecting the position of the rack-bar; when the valve is unseated, and the float is at its lowest level, the pin 29 will be positioned at the lower extremity of the slot 30, as indicated in Fig. 1. Assuming the parts to be in this relative position, it will be seen that by starting the motor to force the rack-bar 28 in an upward direction, the float will be moved upward thus moving the valve in the direction of its seat, to a closed position.

By the modification shown in Fig. 4 of the drawings, the counterweighted lever 23 is dispensed with, and the float 21 is in place thereof connected with one end of a suitably supported retracting spring 31 which serves to assist in supporting the weight of the valve and stem. Under this construction the lower end of the rack-bar, here designated 28' and which is actuated by the motor here designated M', engages a socket 32 in the float 21, with which it is connected by a transverse pin 33, engaging a slot, 34, in the rack-bar, the parts being so proportioned that when the float is at the lower limit of its movement, the pin 33 will be at the bottom of the slot 34. Assuming these conditions it is obvious that upward movement of the rack-bar induced by the motor will move the float and the parts connected therewith in an upward direction with the results hereinbefore described.

Under some circumstances it will be found desirable to install the improved valve in the stand-pipe, below the bottom of the tank instead of within the tank, as hereinbefore described. This arrangement may be readily effected by slightly modifying the construction of the valve-casing, as indicated in Fig. 3 of the drawings, by reference to which it will be seen that the upper member of the valve-casing, here designated 6', is provided with an upward-extending interiorly-threaded annular flange 33 for connection with a section 10' of the stand-pipe, which may be of any desired length and the upper extremity of which will be connected with the bottom 20 of the tank. The valve-stem 16 extends into the tank through the pipe-section 10', and is to be equipped with a float and other mechanism, as hereinbefore described.

It will be readily seen from the foregoing description, taken in connection with the drawings hereto annexed, that the improved automatic valve is particularly adapted and available for tower tanks supplied through stand-pipes by ordinary pumping machinery, the water being forced into the tank through the stand-pipe for the purpose of providing the requisite pressure. The consumption of water is likewise supplied through the stand-pipe, and it is obvious that as long as the production exceeds the consumption, the highest predetermined water-level will be maintained in the tank, and the valve will be seated, thus preventing the admission of additional liquid. When the consumption exceeds the production, the store contained in the tank will be drawn upon, and as the water-level recedes the valve will become automatically unseated, thus enabling water to pass into the tank as soon as the consumption falls below the production. The supply of water to the tank will thus be governed automatically in a very simple and efficient manner.

Emergencies sometimes happen which render it desirable to temporarily utilize the direct pressure of the pumping machinery. When this is desired the motor M is started to actuate the rack-bar in an upward direction, thus seating the valve regardless of the position of the float and related parts.

Having thus described the invention, what is claimed is—

1. A valve-casing having inlet and exit apertures at its lower and upper ends, a deflecting disk supported adjacent to the inlet, a yoke spanning the outlet, and a valve-carrying stem guided through the yoke.

2. A valve-casing composed of separably connected lower and upper members provided respectively with an inlet and outlet, the upper member being provided adjacent to the outlet with a valve-seat and a cylindrical neck or channel below the seat, a deflecting disk supported adjacent to the inlet, a valve seat adjacent to the outlet, a yoke spanning the latter and a valve-carrying stem guided through the yoke.

3. A valve-casing having inlet and outlet apertures at its lower and upper ends and a valve-seat adjacent to the outlet, a suitably guided stem carrying a valve opening downward from the seat, a float upon the valve-stem and means such as a counterweighted lever to assist the float in supporting the valve-carrying stem.

4. A tank, a pipe connected with the tank for the admission and outlet of water, a valve controlling the admission of water through the pipe, a float connected with the valve and operating to seat the latter and to close the inlet port when the water in the tank reaches a predetermined level, and auxiliary means for seating the valve regardless of the level of the water in the tank.

5. A tank, a pipe connected with the bottom of the tank for the admission and outlet of water, a valve-casing having an inlet connected with the pipe and an outlet opening into the tank, said casing being provided with a seat adjacent to the outlet, a suitably guided stem carrying a valve opening downwardly from the seat, a float upon the valve-stem whereby the latter will rise to seat the valve when the water in the tank reaches a predetermined level, and means for forcing the valve stem upward to seat the valve, regardless of the level of the water in the tank supporting the float.

6. A tank, a pipe connected with the bottom of the tank for the admission and outlet of water, a valve casing having an inlet connected with the pipe and an outlet opening into the tank, said casing being provided with a seat adjacent to the outlet, a suitably-guided stem carrying a valve opening downwardly from the seat, a float upon the valve-stem, a motor supported within the tank and means operable by the motor to force the valve-stem upward to seat the valve regardless of the level of the water in the tank and the position of the float.

In testimony whereof I affix my signature in presence of two witnesses.

JOSEPH STEVISON.

Witnesses:
 JAMES DOLAN,
 MANFRED S. BLOCK.